United States Patent
Morato et al.

(10) Patent No.: US 9,317,962 B2
(45) Date of Patent: Apr. 19, 2016

(54) 3D SPACE CONTENT VISUALIZATION SYSTEM

(71) Applicant: Indoor Technologies LTD, London (GB)

(72) Inventors: Pablo Garcia Morato, Toledo (ES); Frida Issa, Haifa (IL)

(73) Assignee: Indoor Technologies LTD, London (GB)

( * ) Notice: Subject to any disclaimer, the term of this patent is extended or adjusted under 35 U.S.C. 154(b) by 138 days.

(21) Appl. No.: 13/969,352

(22) Filed: Aug. 16, 2013

(65) Prior Publication Data
US 2015/0049086 A1    Feb. 19, 2015

(51) Int. Cl.
G06T 19/00 (2011.01)
G06T 15/06 (2011.01)
G06T 3/00 (2006.01)
G06T 15/04 (2011.01)
G06T 15/20 (2011.01)
G06T 17/10 (2006.01)

(52) U.S. Cl.
CPC ............... *G06T 15/06* (2013.01); *G06T 3/0031* (2013.01); *G06T 15/04* (2013.01); *G06T 15/20* (2013.01); *G06T 17/10* (2013.01); *G06T 19/00* (2013.01); G06T 2210/04 (2013.01); G06T 2215/16 (2013.01)

(58) Field of Classification Search
None
See application file for complete search history.

(56) References Cited

U.S. PATENT DOCUMENTS

| 8,542,232 | B2* | 9/2013 | Hyndman et al. | 345/427 |
| 2009/0109216 | A1* | 4/2009 | Uetabira | 345/419 |
| 2011/0134108 | A1* | 6/2011 | Hertenstein | G06T 19/006 345/419 |
| 2012/0092342 | A1* | 4/2012 | Suzuki et al. | 345/420 |
| 2012/0259712 | A1* | 10/2012 | Hyndman et al. | 705/14.73 |
| 2012/0274625 | A1* | 11/2012 | Lynch | 345/419 |
| 2013/0103303 | A1* | 4/2013 | Lynch | 701/410 |
| 2013/0132375 | A1 | 5/2013 | Jones et al. | |
| 2013/0169668 | A1* | 7/2013 | Lynch | 345/619 |
| 2013/0321398 | A1 | 12/2013 | Howard et al. | |

OTHER PUBLICATIONS

International Search Report and Written Opinion issued on Jun. 25, 2015, in the International Application No. PCT/IB2014/02533, filed on Jul. 31, 2014, 21 pages.

* cited by examiner

*Primary Examiner* — Kee M Tung
*Assistant Examiner* — Ryan M Gray
(74) *Attorney, Agent, or Firm* — Wilmer Cutler Pickering Hale and Dorr LLP

(57) ABSTRACT

Methods and systems are provided for visualizing and rendering three-dimensional spaces using two-dimensional content. To create three-dimensional visualizations, the visualization system retrieves two-dimensional content data from a content source, defines at least one layer within the content data, defines at least one anchor within each layer, and defines at least one element within each layer, wherein each element represents an object at a three-dimensional boundary as viewed from at least one of the anchors. To render three-dimensional visualizations, the visualization system identifies an anchor within a layer for which to generate a scene, defines a three-dimensional boundary to capture at least one element within the scene, defines a texture of the three-dimensional boundary, wherein the texture forms a background for the scene, and renders the scene representing the view at the anchor.

9 Claims, 13 Drawing Sheets

3D SPACE CONTENT VISUALIZATION SYSTEM

FIELD OF THE INVENTION

This invention relates generally to the field of three-dimensional visualization, rendering, and augmented reality.

BACKGROUND

When traveling, one of the biggest challenges with navigating in a new location is being able to contextualize the environment and quickly access information about one's surroundings. Complicating this process is the fact that, while the real-world locations exist in three dimensions, location and positioning information are often conveyed in two dimensions, i.e., flat, two-dimensional maps. Whether viewing maps on paper, on a computer screen, or on a mobile device, navigation materials are almost universally presented in two, rather than three dimensions. This disconnect potentially confuses visitors.

As demonstrated with websites such as Wikipedia™ or Yelp™, crowdsourcing can greatly improve informational content. Existing crowdsourcing technologies, however, are suboptimal, as contextual information is often presented in two dimensions, rather than three dimensions.

Technologies like augmented reality have emerged to present geo-contextual information, but are still confusing. Augmented reality presentation techniques thus far are generally disorganized, intrusive and far from being smoothly integrated. Hence, augmented reality is more likely to be viewed as a gimmick, a one-time experience, or a technological engineering project, rather than a new viable way to immerse users into their environment. Moreover, existing augmented reality presentations tend to be computationally demanding, and therefore impractical with a mobile device such as a smartphone.

SUMMARY OF INVENTION

Aspects of the current invention aim to smooth the transition between the three-dimensional "real world" and traditional two-dimensional navigational content. Accordingly, these aspects aim to help the user understand, interact, and consume information about his/her surroundings, perhaps even become proactive by sharing or updating environmental content through crowdsourcing. Aspects of the invention also address the growing interest in incorporating interactivity between mobile users and the information they consume. Other aspects of the current invention present a cohesive solution to augmented reality, more easily consumed and navigated by users.

According to one embodiment, a method for creating three-dimensional visualizations from two-dimensional content data includes retrieving two-dimensional content data from a content source, wherein the content data contains location information. The method also includes defining at least one layer within the content data and defining at least one anchor within each layer, each anchor having a fixed location within at least one of the layers, and defining at least one element within each layer, each element having a fixed location and size within at least one of the layers, wherein each element represents an object at a three-dimensional boundary as viewed from at least one of the anchors.

According to another embodiment, a method for rendering three-dimensional visualizations includes identifying an anchor within a layer from which to generate a scene. The method also includes defining a three-dimensional boundary to capture at least one element within the scene; defining a texture of the three-dimensional boundary, wherein the texture forms a background for the scene; and rendering the scene representing a view of at least a portion of the boundary.

According to an embodiment, a method for interacting with a three-dimensional visualization of a location includes rendering a three-dimensional scene within a two-dimensional layer, wherein the three-dimensional scene is generated using an anchor that is fixed in position within the two-dimensional layer. The method also includes identifying at least one of a specific element and location in the layer where content data may be attached, and attaching the content data to at least one of an element and location within the layer to incorporate the content data into the scene.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

The current disclosure provides a system and method to generate and render a three-dimensional space from two-dimensional mapping data that is useful, organized, and efficient with computational resources. Various embodiments visualize locations and sites using one or more layers, such as levels in a multi-story shopping mall. In some embodiments, the visualization system splits the site into multiple layers, where layers are planes with x- and y-coordinates. Each layer also may have a specific z-coordinate associated with it; thus, some embodiments may have multiple layers depending on the site to be visualized.

Figure 1:
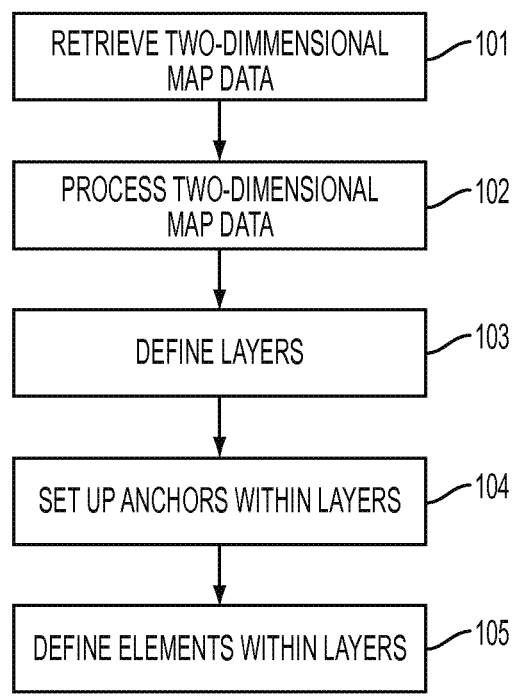
FIG. 1 is a flow diagram showing the layer created from two-dimensional map data in accordance with certain embodiments of the disclosed subject matter.

In some embodiments, the visualization system may be organized into two organizational processes, known as "layer creation" and "scene rendering" respectively. FIG. 1 is a flow diagram illustrating the steps in the "layer creation" stage, where layers are defined and created to visualize a three-dimensional scene from two-dimensional mapping data.

In Step 101 of FIG. 1, two-dimensional map data may be received by a computing device. In some embodiments, the computing device may be a mobile device, such as a smartphone or tablet, or wearable technology, or a computer, such as a desktop, laptop or computing server. The two-dimensional map data may come from a variety of sources, the Internet, cloud/network sources, local data media, or third-party sources. Two-dimensional mapping data may be retrieved or received through a variety of mediums, such as through local media, WiFi, or Ethernet.

In Step 102 of FIG. 1, two-dimensional map data may be processed by the computing device in order to extract the information relevant to rendering the information in three dimensions. In some embodiments, two-dimensional maps may be converted using scalable vector graphics for processing. Once processed, the maps may then be split into regions to identify the pathways and object spaces. Scalable vector graphics (SVG) may encapsulate the visual information into XML style files. This visual information may include, for example, closed polygons tagged to represent a region, a shop, or any point of interest. The SVG data can be read, and each closed polygon defined in the file may be considered an area. SVG may also support tagging and labeling the polygons. Using SVG, paths may be created by systematically checking for blank areas, i.e. areas free of polygons, around the borders of each and every polygon. Where a blank area is located, a reference point may be set to indicate entry into the spot or shop. This process may be repeated for all the polygons in the map set.

Once all reference points in an entire mapping are determined, paths may be determined by connecting the reference points with lines that do not intersect any polygons. This may be achieved by looping the lines in the SVG with their exact position to get a presentation of regions and paths. Conversion to three dimensions may occur by adding depth to the two-dimensional polygons found in the map. Additionally, the paths may be converted from lines into a two-dimensional plane on the three-dimensional map, layered like a carpet over the three-dimensional map in order to show the possible paths between source and destination points. Texture may also be assigned to each polygon using image association. In some embodiments, an attribute in the SVG file may precisely define the transparency of the polygon texture, e.g., storefront windows.

In Step 103 of FIG. 1, layers may be defined from the mapping data. In some embodiments, an entire environment may be defined in a single layer, which is a two-dimensional plane fixed in three-dimensional space, whereas in other embodiments multiple layers may be needed to separate the user's visualization experience and split the content. In certain embodiments, a single layer may be used to represent a floor in a multi-story mall. In other embodiments, a single layer may be used to represent one level of a multi-leveled attraction park. The use of a single layer with a fixed, uniform pixel height to represent an environment, an entire floor, or story provides computational efficiency gains and simplifies the rendering process in comparison to current technologies.

Figure 2:
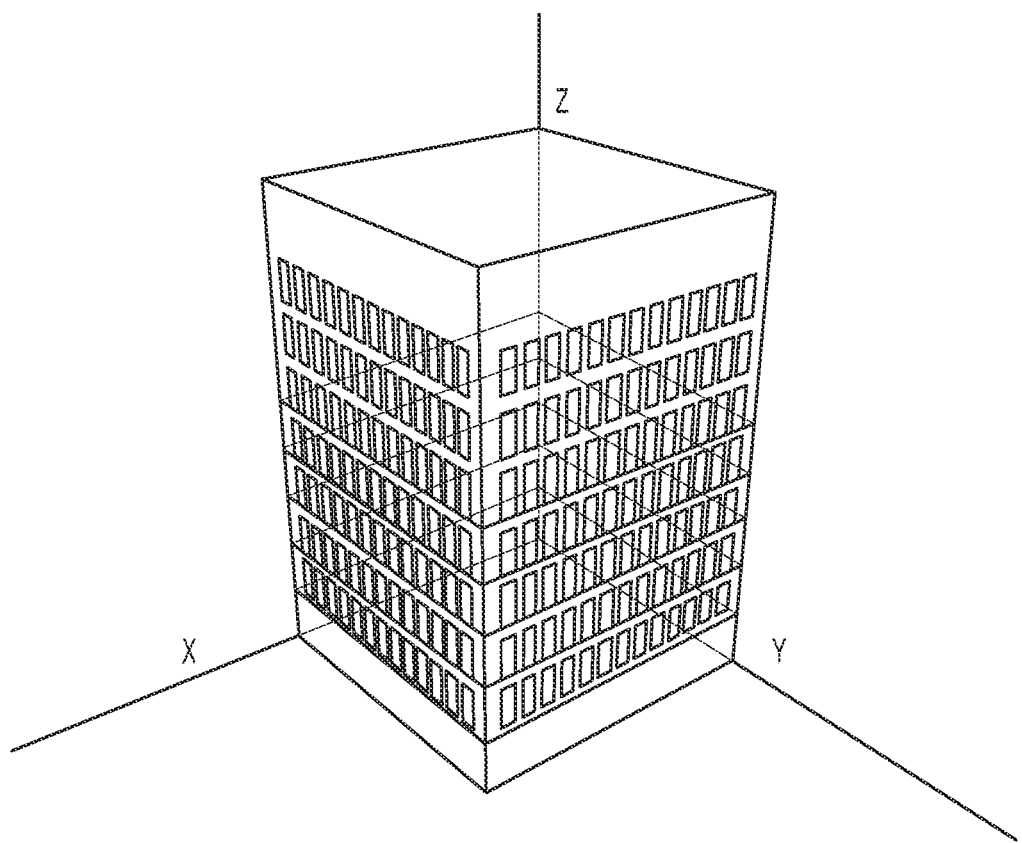
FIG. 2 is a pictorial illustrating how environments are visualized as layers in accordance with certain embodiments of the disclosed subject matter.

FIG. 2 illustrates an example of how a multi-storied building may comprise multiple layers (x- and y-coordinate planes) that span the z-coordinate space.

Multiple layers may be used when the information for display for the users need not appear all at once. By moving between layers, a user may be exposed to new content existing on a different layer. In connection with anchors, each individual layer represents all that the user may be able to view from a specific anchor on that specific layer.

In Step 104 of FIG. 1, anchors may be defined and incorporated in the layer. Anchors are predetermined fixed locations (defined using x- and y-coordinates) within the layer. They function as reference or target points where "scenes" of the layer may be generated. These virtual locations correspond to real locations within a corresponding real-world site. For example, in one embodiment, an anchor in a layer representing a floor of a shopping mall may correspond to a location in that shopping mall. Thus, a scene rendered from that anchor may be a visual representation of what a user may see in the representative location, i.e., that location in the shopping mall.

In some embodiments, a reduced number of anchors may be preferred in order to decrease the amount of processing power required. Thus, some embodiments may be more appropriate for power-sensitive applications, such as in mobile telephony or smartphones where the devices have limited computational and power resources.

In Step 105 of FIG. 1, the "elements" in the layer are defined. Elements may be three-dimensional objects and animations within a layer that represent information, actions, or objects accessible by the user. Elements may be located within the layer using x-, y- and z-coordinates. In some embodiments, elements are placed over the entire layer. In some embodiments, all elements in the same layer are the same height. In other embodiments, elements may have different heights by extending to different layers. Placing elements in different layers separates the information the user is capable of seeing in a given scene in a particular layer.

Figure 3:
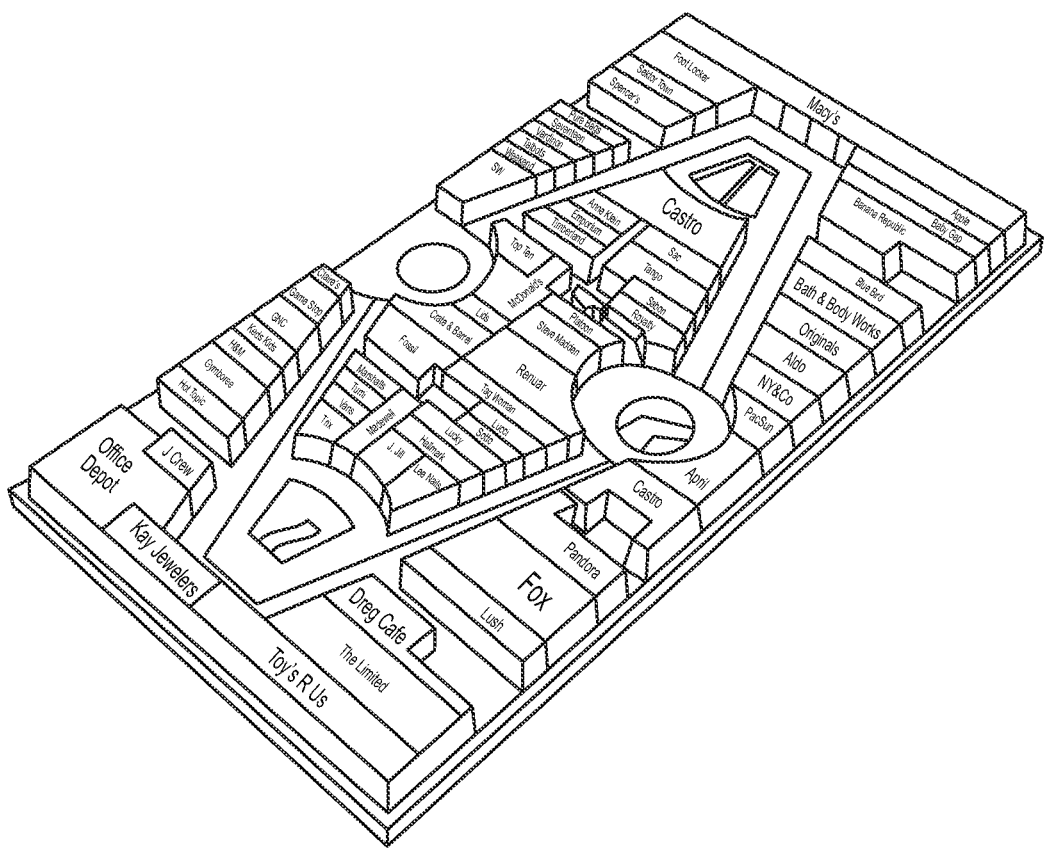
FIG. 3 is a pictorial illustrating a layer populated in accordance with certain embodiments of the disclosed subject matter.

FIG. 3 illustrates an example of a layer representing a single floor in a shopping mall. It may be populated with elements that represent, for example, stores, kiosks, and elevators in the shopping mall. In some embodiments, elements may represent spots of interest, such as vista points and sightseeing locations, shops in a shopping mall, clothes within a shop, promotional posters on the storefront, or avatars of people or other objects inside the layer space.

Once the "layer creation" phase is complete, the layer information may be stored in a digital data repository. This repository may be located locally, in media, or in a network location for later retrieval by an interested user of the system.

In some embodiments, layer information may be organized in a text file to save space, and reduce transfer time over the Internet. The use of lightweight file formats allows for rapid transfer, particularly over a wireless/cloud network, which helps to reduce the time from user request to when the information is actually displayed. In some embodiments, the layer information may be organized in a plain text binary file using basic naming conventions and fields. This organization allows for rapid file parsing and thus layer rendering. For example, these fields may include:

ctl_dummy_id: Anchor location as represented by x- and y-coordinates. For example, the value tagged ctl_dummy_1 may represent the coordinates of an anchor element with an identifier equal to "1". This anchor may have two properties in addition to the identifier, such as an x-coordinate and y-coordinate, to define the position of the anchor in the layer.

ctl_dummy_hotspot_id: Element location as represented by x- and y-coordinates. As discussed earlier, these interactive elements may represent information useful for the device user (i.e., hamburger, clothes, a virtual poster with info, stairs, elevators, etc.). The element properties may comprise an identifier, x- and y-coordinates to define its location, and any structure that explains how to present this element and how a user may interact with it. For example, the element may be a three-dimensional model in a three-dimensional format and textures, or two-dimensional information. Additionally, the element may represent any location where user interactions may be associated, such as clicking, dragging, or any other interaction beyond merely viewing it. The element may have interaction callback that may be triggered on a click event, touch event, or other forms of user interaction. For example, an element may have a callback to either scale up and double in size or to call a specific telephone number.

ctl_floor: Represents the whole layer, allowing for loading and accessing the whole layer.

ctl_m_doll: Represents the user's position and may include a three-dimensional representation.

ctl_room_placeId: Represents rooms or places within the layer. In some embodiments, rooms may be retrieved in order to change the texture when the user clicks or triggers any action. For example, if a user were to click on a sports shop element, the system may change the texture to show that the sports shop was selected by the user.

m_edge_dA_dB: Defines a line that separates the border between two or more anchors. In some embodiments, these "edges" may be used to represent routes for a user to travel from one anchor to another. In some embodiments, the edges that connect two anchors along the path to reach the destination will be highlighted and assist the user to identify the exact route between his/her origin and destination in the layer. In some embodiments, the texture of the edges along the specific route may be changed. dA and dB are the identifiers of the anchors that border the edge (e.g., m_edge_1_2 is the line that borders ctl_dummy_1 and ctl_dummy_2).

ctl_m_360_sphere: Represents a spherical boundary object for the scene. Accessing this element in the layer, the user can view the scene around him/her in the context created by the sphere. The user may be able to move the object along the anchors, which may change the texture of the boundary object to a virtual tour experience across the layer.

ctl_m_arrow_dA_dB: Represents arrows that indicate directions where a user can move in a virtual tour (360-degree views). In some embodiments, arrows may visually appear in the directions where the user can proceed during the visual tour.

Figure 12:
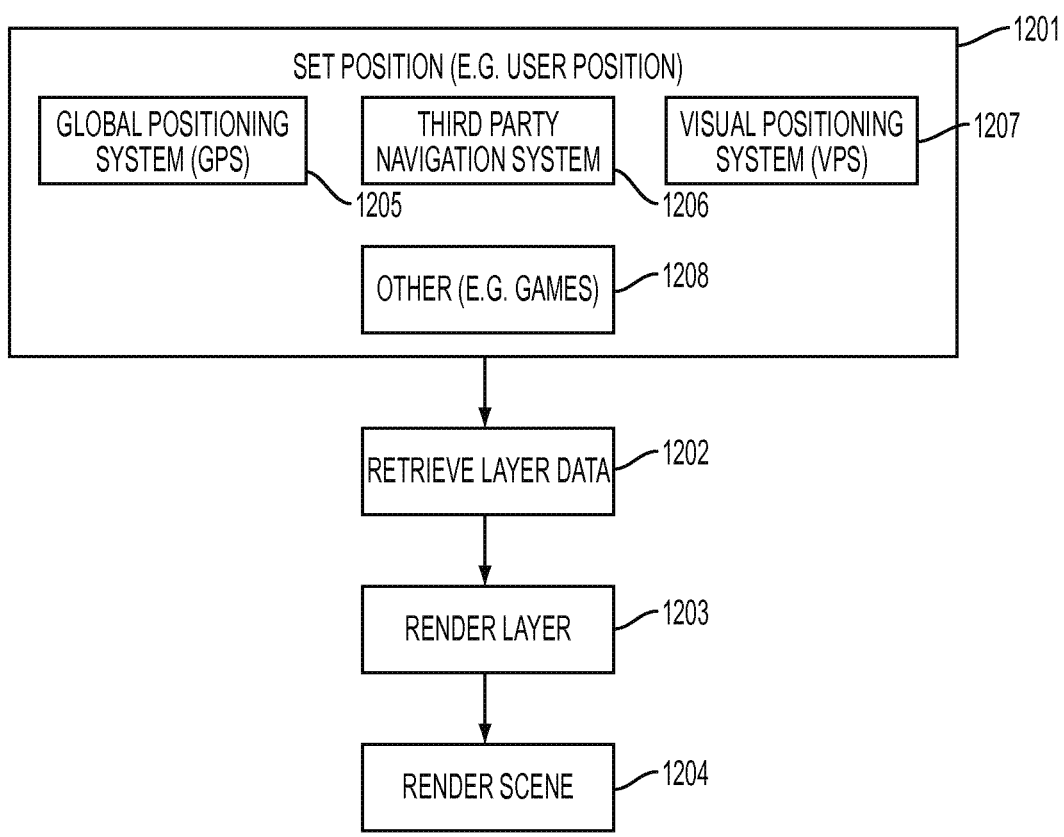
FIG. 12 is a flow diagram illustrating how scene positions are determined in order to select an anchor and render a scene in accordance with certain embodiments of the disclosed subject matter.

The layers having been created, the visualization system may be available for users' consumption. FIG. 12 is a flowchart that illustrates how positioning information may be used to determine and retrieve the appropriate layer and, ultimately, render the requested "scene." FIG. 13 is a simplified block diagram illustrating the "scene rendering" application on a computing device 1301.

Figure 13:
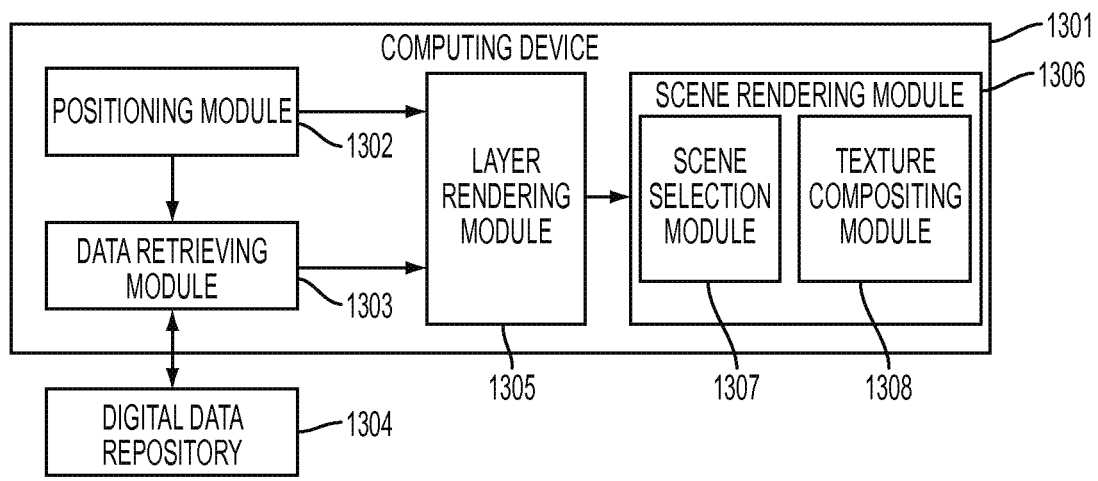
FIG. 13 is a simplified block diagram illustrating how a requested scene may be rendered in an application on a user's computing device in accordance with certain embodiments of the disclosed subject matter.

As illustrated by block 1201 in FIG. 12, and exemplified by computing device 1301 in FIG. 13, in some embodiments, a user's computing device may set the scene position using a variety of methods and technologies, especially when the environment visualized to the user is a real-world location and is therefore serviced by alternative positioning systems. In some embodiments, the user's position may be measured using GPS or third-party signal triangulation based on WiFi, Bluetooth, or audio signals as illustrated by blocks 1205, 1206. In some embodiments, a visual positioning system ("VPS") that uses computer vision may be used to locate the user's position as illustrated by block 1207. A VPS utilizes user visual information captured by cameras to determine a user's exact position in a facility. In a VPS, all visual information is associated with locations on a map. Locations in a VPS are thus determined by identifying specific visual information that a user may be viewing, followed by referencing that information in a database. In some embodiments, a navigation system that uses a combination of these technologies may be employed to determine the user's exact location. In some embodiments, the user's position may be tracked by a game as illustrated by block 1208. Alternatively, in other embodiments, the specific scene position may be user-selected or defined by other methods, rather than selected using a navigational or positioning system. This may be applicable where the environment visualized is a completely virtual environment created as a game or any other experience.

As shown by block 1202 in FIG. 12, using the calculated or selected position, the computing device 1301 in FIG. 13 retrieves the layer data from a digital data repository 1304. As discussed earlier, in some embodiments, the layer information may be stored locally, in media, or in a network location.

As shown by block 1203 in FIG. 12, the layer may be rendered once received. As shown in some embodiments, the layer rendering module 1305 in FIG. 13 may apply information about the user's position from positioning module 1302 and the layer information from the data retrieving module 1303 to render the appropriate layer. Based on the location information from positioning module 1302, the appropriate location site may be determined based on coordinates that approximate the user's desired location and the location sites stored in the digital data repository 1304. In some embodiments, the location information from positioning module 1302 may be sent to digital data repository 1304, where the appropriate layer may be selected prior to transfer to computing device 1301. In some embodiments, the location site layers may be transferred to computing device 1301, where the layer rendering module 1305 may determine which layer to render out of the layers received by the data retrieving module 1303.

In some embodiments, the attributes of the layers and elements may be modularly organized. The following attributes may be adjusted or edited dynamically to immediately affect the rendered layer:

Layer dimensions in x- and y-coordinates.
Anchor positions in x- and y-coordinates.
Layer element information, such as:
　Layer element positions in x- and y-coordinates.
　Layer element vertices as each element is defined by a set of jointed coordinates. Jointed coordinates may be the boundary vertices of an element. For example, in a rectangular-shaped element, the element may have four jointed coordinates that define the four corners of the element.
　Layer element images or animation frames, including a time line that represents the state of each animation, if applicable.
Layer effects, including lights, transparency, and reflections. Lights, three-dimensional objects that may add lighting effects to the rendered scene, can affect the appearance of the entire scene. For example, different lights may be used to create daylight or nighttime situations. In some embodiments, the layer may be transparent and may only represent a space for the elements from the user's perspective. In other embodiments, the layer may not be transparent and may itself include an attribute of a three-dimensional model, where the model may include a terrain description. Furthermore, the terrain may be at least partially transparent in its texture and create at least a mixed reality.

Scene boundary shape and texture. In some embodiments, the three-dimensional scene boundary may be set as any model shape and/or texture.

As illustrated by block 1204 in FIG. 12, using the calculated position, the computing device may then locate the appropriate anchor within the rendered layer in order to render the scene. In some embodiments, the most appropriate anchor may be the anchor closest to the user's representative location in the corresponding layer. This may involve determining the anchor with the shortest distance from the user's representative location in the corresponding layer. In some embodiments, some layers may have a reduced number of anchors in order to reduce the computational workload for this step.

Having selected the appropriate anchor, in some embodiments, the scene rendering module 1306 may comprise scene selection module 1307 and texture composition module 1308 in order to select the relevant scene based on the anchor and render the scene according to the desired texture. In some embodiments, this may involve calculating the layer elements that are enclosed within the boundary object based on the boundary radius and the distance of layer elements from the selected anchor. In some embodiments, the layer elements may be rendered based on their access to the user's field of view. Depending on the layer elements enclosed by the boundary object, the boundary may be populated with images associated with those layer elements. In some embodiments, the texture composition module 1308 may also require calculations for alpha compositing as required by the user's requirements. Depending on the levels of transparency required, the texture of the boundary object may or may not allow visibility of a video feed from a camera attached to computing device 1301.

Figure 4:
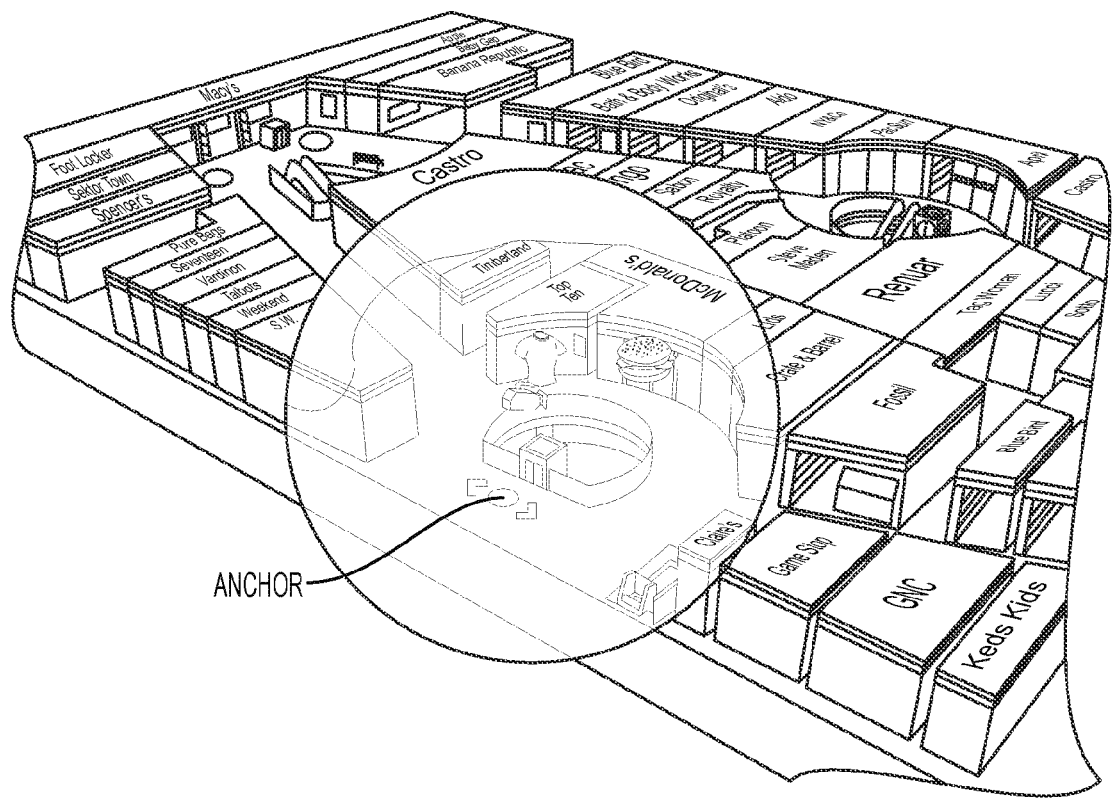
FIG. 4 is a pictorial illustrating how scenes are built around anchors in accordance with certain embodiments of the disclosed subject matter.

FIG. 4 illustrates how a "scene," the visualization experience around the anchor, may be defined around a specific anchor within a layer using a three-dimensional boundary object, such as a sphere or a polygon. In some embodiments, the boundary will be selected that best describes the context of the content needed to be displayed for any purpose at any anchor. In some embodiments, the boundary is a sphere that allows for a 360-degree field of view. In some embodiments, several scenes may be assigned to the same anchor using different boundary shapes. For example, a single anchor may define two spherical scenes with different radii to create different visual experiences, i.e., the ability to see different elements.

The boundary forms the borders of a "sub-world" created around the specific anchor. The boundary may encapsulate specific elements in the layer around the anchor, creating the scene for the user to view. Depending on the size of the boundary, i.e., the field of view, a spherical boundary may have a broad or narrow field of view to a camera at the center of the sphere. In some embodiments, when a scene is captured by a spherical boundary object, the "field of view" is the radius of the boundary object, i.e., the radius of the three-dimensional sphere when the user is situated at its center. In some embodiments, when the camera is situated along the edge of the spherical boundary, the field of view may still be limited by the shape of the boundary object, i.e., the camera may only be capable of displaying elements that are enclosed by the spherical boundary object as shown in FIG. 5A; i.e., the "field of view" may still be limited to the scene as bounded by the boundary object.

Figure 5A:
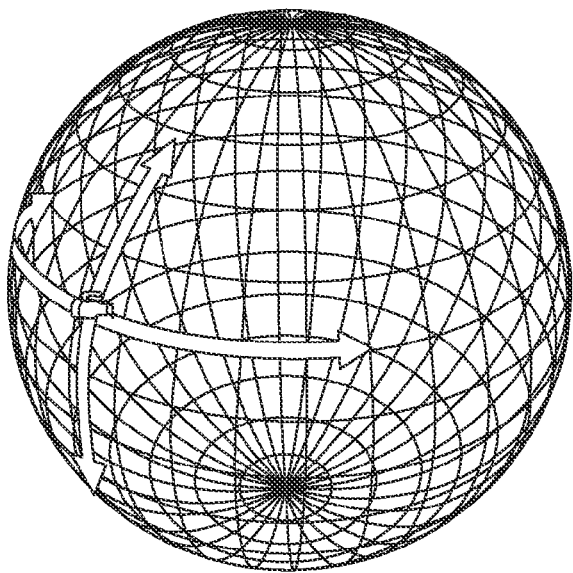
FIGS. 5A and 5B are pictorials illustrating different camera orientations in accordance with certain embodiments of the disclosed subject matter.
Figure 5B:
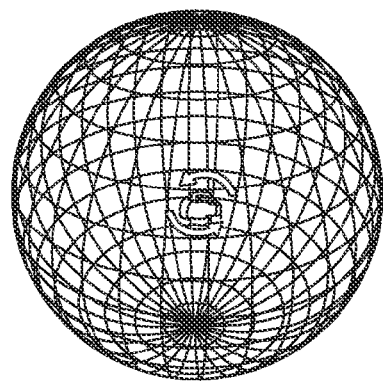

FIG. 5 illustrates how a camera within a scene may be rotated, translated, or moved to generate a different point of view. In some embodiments, a camera may determine the user's point of view, i.e., how the user perceives the elements within the scene. In some embodiments, the camera can be either positioned in the center (as in FIG. 5B) or outside the scene (as in FIG. 5A). In some embodiments, if the camera is placed in the center of the scene, as in FIG. 5B, it can rotate on all axes in every possible degree, and change its field of view. In some embodiments, however, the camera cannot translate its position beyond that allowed by the scene. In some embodiments, if the camera is placed at the periphery of the scene, as in FIG. 5A, it can be moved to any position along the periphery.

Figure 6:
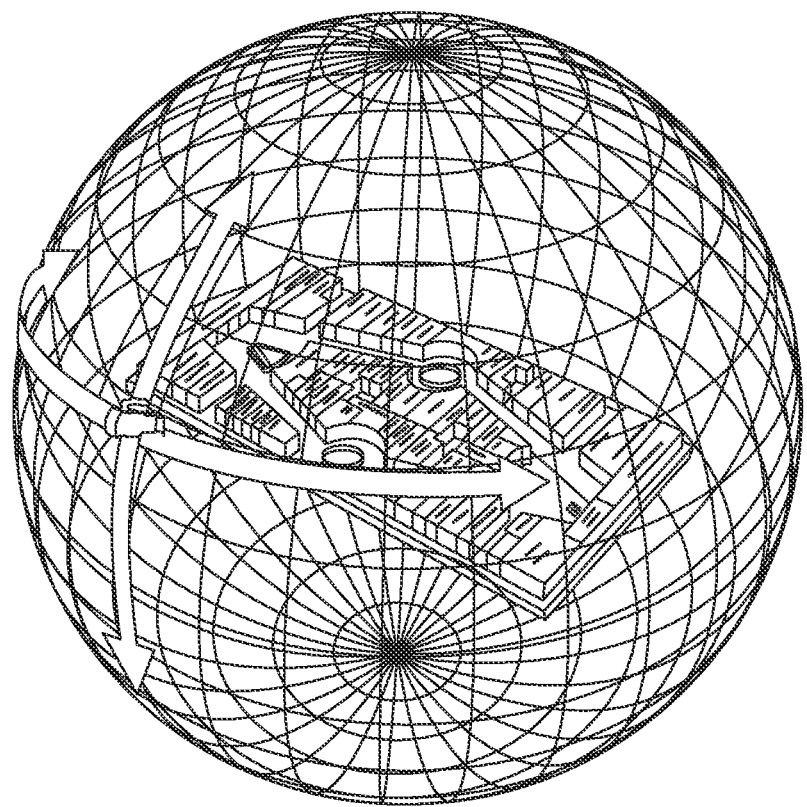
FIG. 6 is a pictorial illustrating an external camera scene of a layer in accordance with certain embodiments of the disclosed subject matter.

FIG. 6 illustrates how a camera along the edge of the scene may provide a different perspective to a user, such as an outside viewer, instead of placing him/her in the center of the scene. In a spherical scene, the camera can move around the scene sphere and therefore change the position from where the user is looking at the scene.

With the selection of a different anchor, a new boundary may be constituted around the different anchor, leading to a different scene that may reveal a different view of the same layer.

The texture of the boundary object determines the virtual view of the user and, in some embodiments, will act as a background for the scene being rendered. Since the system can be executed over any mobile device or computer, it should be possible for the user to associate it with other views that he/she wants. In some embodiments, it may be possible to add other systems, such as one which plays a background video in order to generate a completely artificial user experience. In some embodiments, the camera feed view creates an augmented reality. In some embodiments, a custom view may be set over another view as a frame. In some embodiments, reflections may be embedded into the three-dimensional model to create special effects when the three-dimensional layer object is rendered, such as when the layer has a three-dimensional object representation. In some embodiments, alpha compositing may be used to generate a predetermined amount of transparency between the boundary and the elements in the layer around the anchor. For example, in an embodiment where alpha compositing renders the boundary object completely transparent, the camera may completely view the elements in the layer that intersects the boundary. To the user, the scene appears to be merged completely into the other environment.

In some embodiments, the alpha compositing may be variable, rendering the scene completely transparent to video and graphical data; completely opaque, thus blocking that data; or partially transparent, thus partially obscuring the data. Accordingly, in some embodiments, the video or graphic information from the user's device may be interspersed with information in the boundary object. In this way, the system may incorporate augmented reality, such that the scene captured by a camera or other device appears behind the boundary.

In some embodiments, the visualization system merges live video feed captured by a video-capable camera to generate an "augmented reality" view. In such an embodiment, the device video feed will be layered with the elements rendered in the current scene around the current anchor in the layer.

Figure 7:
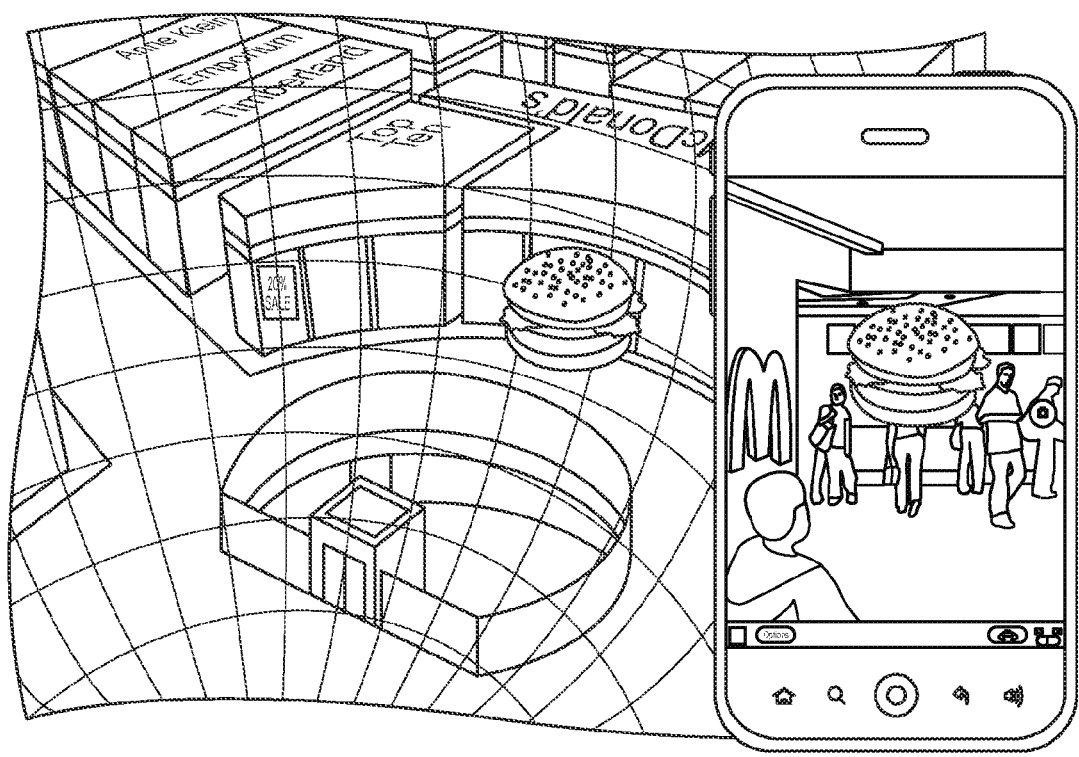
FIG. 7 is an illustration of a scene with a transparent layer in accordance with certain embodiments of the disclosed subject matter.

FIG. 7 illustrates an embodiment where the texture of the boundary object is completely transparent. In this embodiment, the elements in the scene (hamburger logo) will overlay the device camera feed (restaurant front with customers) to generate an "augmented reality" scene.

Figure 8:
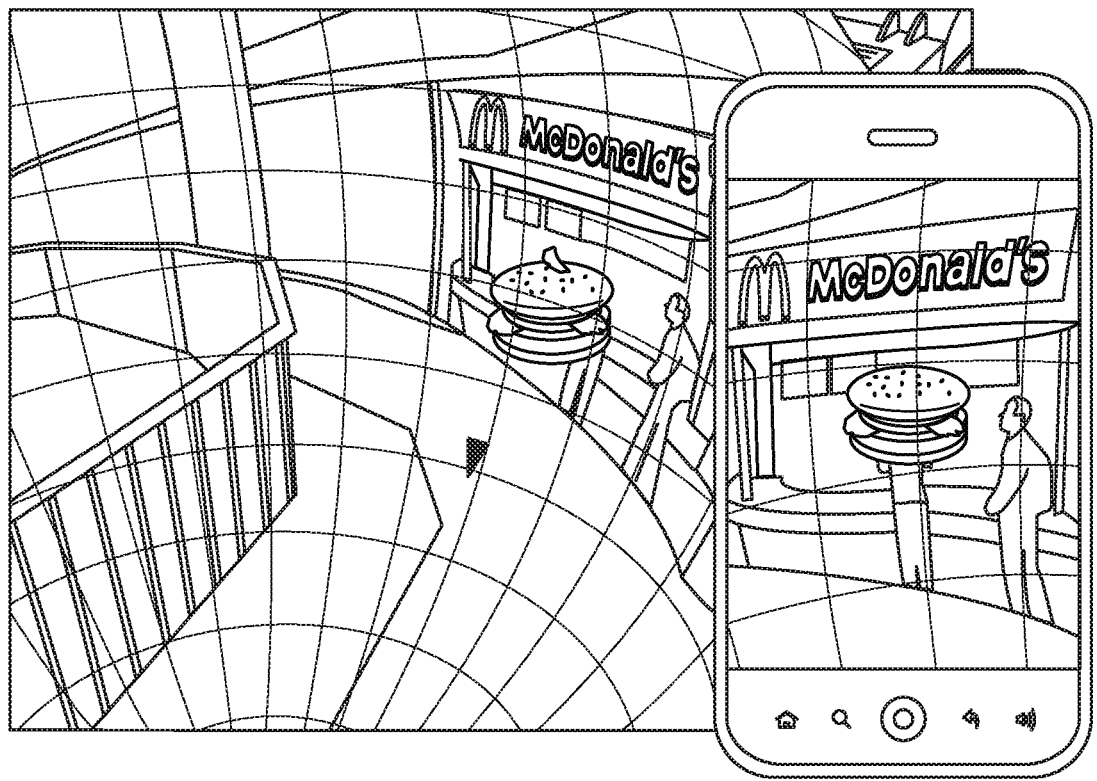
FIG. 8 is an illustration of a scene with an opaque layer in accordance with certain embodiments of the disclosed subject matter.

FIG. 8 illustrates an embodiment where the texture of the boundary object is completely opaque. In this embodiment, the elements in the scene (hamburger logo) will overlay background images (still image of restaurant front) that are anchored to elements and coordinates in the layer.

Figure 9:
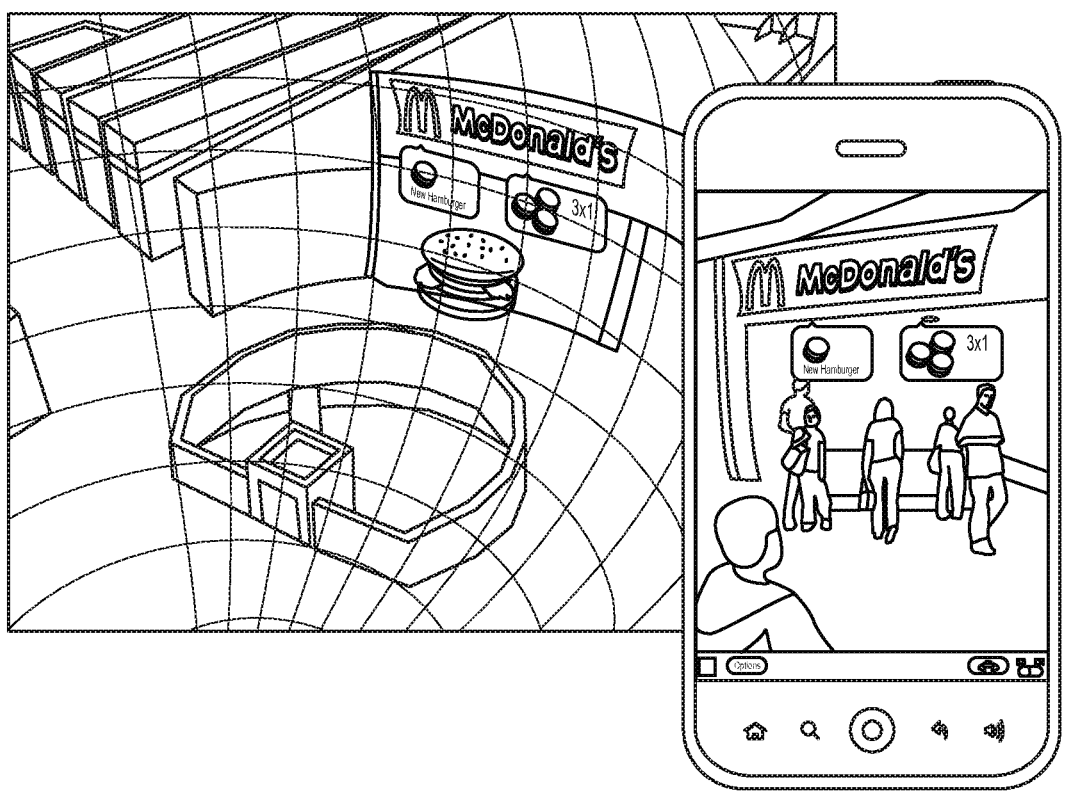
FIG. 9 is an illustration of a scene with a mixed transparent and opaque layer in accordance with certain embodiments of the disclosed subject matter.

FIG. 9 illustrates an embodiment where the texture of the boundary object is partially transparent. In this embodiment, the images anchored to the elements and coordinates in the layer will be interspersed with the device camera feed or any other feed to present an altered "augmented reality" scene.

Some embodiments may incorporate social content into the layers. In some embodiments, a flexible and editable layer system may be user-interactive and responsive, making the system socially sustainable, allowing users to add content, anchors, elements, and media content such as text, images, audio, or video to the scene. A socially sustainable system, which users actively and progressively populate with content, can generate a positive feedback loop which can attract more users, encourage more content, and thus attract even more users.

Figure 10A:
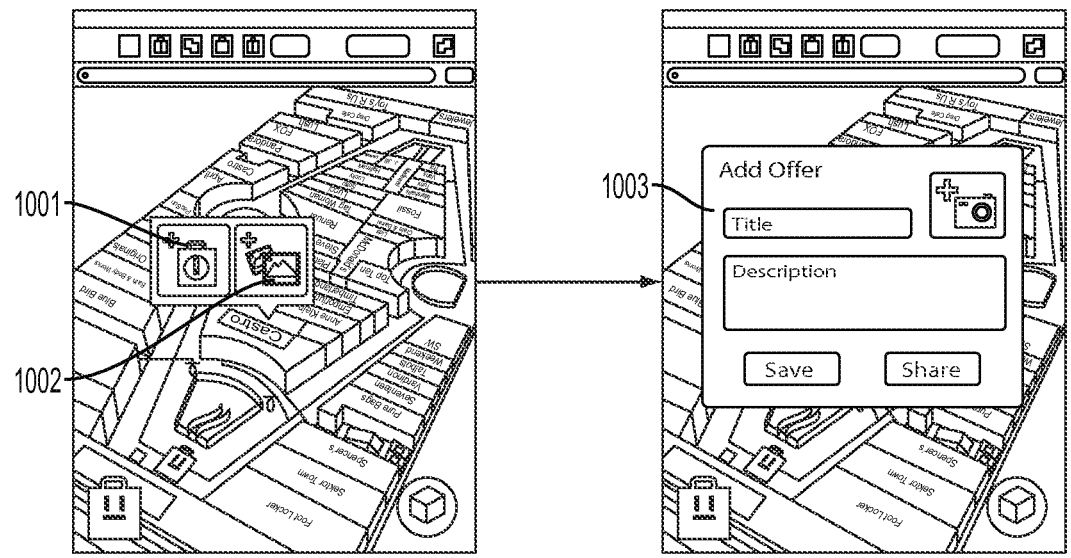
FIGS. 10A and 10B are flow diagrams of the incorporation of social media into the layer in accordance with certain embodiments of the disclosed subject matter.

FIG. 10 illustrates different examples for incorporating social content into the layers. In FIG. 10A, social content, such as an advertisement for a sales promotion represented by icon 1001, is anchored to an element, such as a store front, for recognition. Once anchored, details of the promotional offer may be edited for consumption of other users, as shown in icon 1003. Similarly, an image associated with the element may be attached by selecting icon 1002.

Figure 10B:
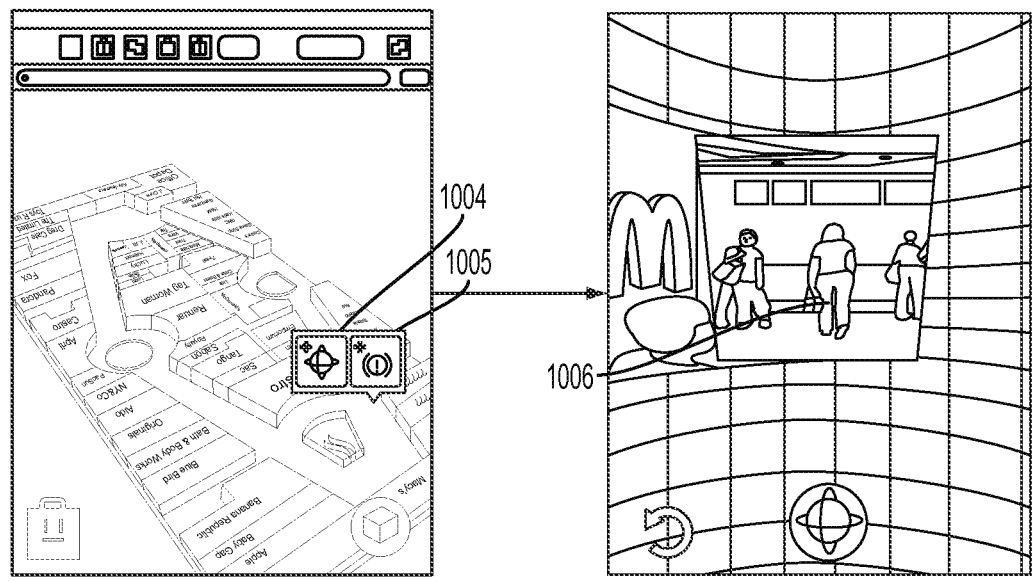

In FIG. 10B, a user-generated image, logo, or photograph, such as a live scene before a restaurant, is anchored to a particular coordinate location within the layer. For example, a particular coordinate location within the layer may be created by selecting icon 1005. The specific anchor may also have images (e.g., item 1006) linked to the corresponding scene using icon 1004.

Figure 11:
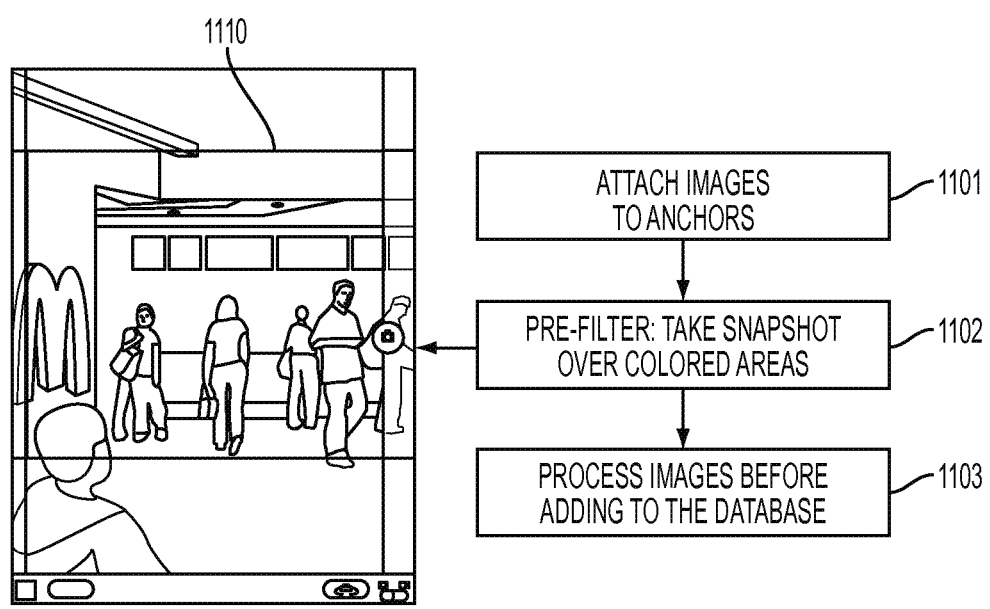
FIG. 11 is a flow diagram showing the incorporation of social media content to enhance a visualization system in accordance with certain embodiments of the disclosed subject matter.

Social content may be especially useful to develop a functional visualization system. FIG. 11 illustrates a flow diagram for incorporating social content into a visualization positioning system in accordance with one embodiment. For example, in Step 1101, in association with a visual positioning system that needs image information for different locations, users can utilize this social content to add images and associate them to anchors or elements in the layer using methods disclosed earlier. In Step 1102, areas missing adequate images, or areas where additional images are desired, are populated with colored placeholders (indicated by rectangle 1110, with a camera icon on its right side) to indicate that an image should be added in that location. This form of pre-filtering prevents the addition of duplicative or undesired social content, and encourages the addition of social content in select locations. In Step 1103, images identified for capture using colored areas may be processed and analyzed before permanently adding to the database for future use for position/ location recognition, resulting in faster and more accurate recognition. In some embodiments, images may be screened for offensive or inappropriate content. In some embodiments, images may require administrative review, confirmation, or approval before they are incorporated into the system. In some embodiments, the system may also allow animations to be anchored to the elements or layers.

Depending on the specific embodiment, users may have multiple methods of interacting with the rendered scene. In some embodiments, the interaction may be through a portable device, such as a smartphone, tablet, or wearable technology. In some embodiments, the interaction may take place through a computer, such as a laptop, desktop, or server computer. A portable device, for example, may be well-suited for use at the location, whereas a computer may be better suited for taking a virtual tour of the actual location before or instead of visiting the location.

In some embodiments, the user may select from which anchor to view a scene. In other embodiments, this process may be determined by a navigation system. Displacement from one anchor to another or from one layer to another will trigger the creation and rendering of a new scene or layer as required.

In some embodiments, the user may control his or her field of view by pivoting the camera or translating the camera within the scene. The user may then view different elements of a scene from different angles and distances. FIGS. 5 and 6 illustrate how the camera may be rotated or positioned within a scene according to one embodiment.

In some embodiments, the motion of the camera within a scene may be manipulated using sensors of a computing device, such as an accelerometer, a compass, or a gyroscope; or manually by touch events or click events, keyboard, or voice command.

In some embodiments, layer elements may be reused to conserve computational power. For example, in some embodiments, a single boundary shape may be reused at every anchor point selected by the user. Each time a user changes his/her position, i.e., moves to another anchor, the camera and boundary shape (e.g., sphere) will move to the new anchor. When the boundary shape is constant, the computational load may be reduced when moving from anchor to anchor. Similarly, information for elements may be reused. For example, one embodiment may reuse a three-dimensional representation of an offer of a particular store in a shopping mall for several different stores.

In some embodiments, the number of anchors may be limited within a given layer, to limit the number of elements in the layer.

In some embodiments, the field of view may be limited to reduce the amount of rendering for a given scene. When the embodiment uses a spherical boundary for the scene, reducing the field of view reduces the radius of the spherical boundary, thus reducing the number of elements to be rendered within the scene.

In some embodiments, a fully opaque texture may be used to reduce the rendering workload. In contrast to layering a device camera video feed, setting a static background image may be less demanding in terms of computational power.

In some embodiments, simple polygonal shapes may be used for elements in a layer. For example, cubes may be used to represent stores in a shopping mall, while plain slopes may be used to represent stairs or escalators. In some embodiments, textures may be used to enrich those simple elements, instead of actually creating those details in three dimensions. Thus, the polygonal count may be reduced. In some embodiments, user adjustment to the field of view may be implemented by translating the camera around the scene, rather than rotating or pivoting the layer elements. For example, in an augmented reality scene, using a spherical boundary object with a transparent texture and live device video feed as background, points of interest (three-dimensional elements around the user) may remain in a fixed position, while the camera may be translated around the scene, dramatically decreasing the rendering load and, as a result, improve the frame rate.

In some embodiments, the information may be used as part of a three-dimensional visualization system for indoor or outdoor navigation. For example, the system may be a component in an indoor navigation and visualization system. In one embodiment, as a component of an indoor navigation system, the system may use a camera to capture what the user is seeing, process the capture, and recognize the position of the user according to a reference database of visual information, which may be pools of photos or videos assigned to physical positions in a location site. For example, the system may use FERNS (Fast Keypoint Recognition Using Random Ferns) or SURF (Speeded Up Robust Features) extraction and detection algorithms. If the algorithm returns multiple locations rather than a single one, some embodiments may run additional calculations to determine which of the potential locations is correct. In some embodiments, the calculations may involve checking the geometry of the corners of the images for matches. In some embodiments, the calculations may involve sorting according to the area covered inside the frame. In some embodiments, the calculations involve analyzing the orientations of the images. The orientation analysis may include applying a translation and rotation matrix relatively to the original picture in the pool of the map. The image that has the least depth translation, i.e., covers a bigger area of the frame with the least degree of rotation, may be selected and thus belongs to a specific, assigned mapping.

In one embodiment, it may be capable of taking a two-dimensional map presentation, analyze, process, and separate it into blocks and pathways between those blocks. For example, a "smart path creator" algorithm may detect black or dark lines within the white or blank areas in the plan so the available paths can be marked. Walls, corners, and doors, as well as corridors, rooms, and halls may be detected, and available walking paths may be identified. If the input to be processed is a photo format, the algorithm may be based on pixel contrast detection, and can distinguish between the dark edges of the lines that represent the map and clear plain spaces that represent the available space. The algorithm may be checked and modified by the user, or the user may input the paths manually. If the format is SVG, an algorithm, similar to that which was discussed earlier, may be run.

A user of the system may associate visual information with each block, such as a photo or a video, to identify each block uniquely. In this embodiment, a computer vision engine may receive a frame taken from a camera, analyze it and determine to which block the frame belongs. For example, when the system detects the block, the user's position is determined exactly according to the distance and orientation of the reference information appearing in the processed frame.

In one embodiment, as part of a three-dimensional training system for computer vision purposes, the system provides a powerful way to "train" visual information of photos and three-dimensional models for the recognition of three-dimensional objects, such as faces for facial recognition, and environments, such as for virtual worlds. This may be extremely beneficial, since visual information from real-world locations is often subject to varying lighting conditions, disparate distances, and different orientations and other effects that may inhibit image recognition.

The system may recreate the same environmental challenges, such as lighting, shadows, occlusion, rotation, and translation, to "train" the system to ignore those environmental effects. Training methodologies may include modifying illumination conditions of the scene, modifying picturing directions, modifying textures of the object and the scene, animating the object in the scene, and introducing occluding objects. For example, modifying variable illumination may comprise modifying ambient lighting (a fixed-intensity and fixed-color light source that affects all objects in the scene equally), directional lighting (equal illumination from a given direction), point lighting (illumination originating from a single point and spreading outward in all directions), spotlight lighting (originating from a single point and spreading outward in a coned direction, growing wider in area and weaker in influence as the distance from the object grows), and area lighting (originating from a single plane).

In another embodiment, the system may build on the previously discussed embodiments as a three-dimensional visualization of the environment that allows a user to virtually navigate through any indoor or outdoor space, and know exactly where he/she may be using computer-generated anchored scenes, and consume content in the layer and/or contribute and update it using the social content.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. For example, the disclosed subject matter may be implemented in hardware and/or software where the software may be provided on a tangible computer-readable medium. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

What is claimed is:

1. A method for rendering three-dimensional visualizations at a mobile device, the method comprising:
    retrieving information associated with a layer from a digital data repository via a wireless communication link;
    identifying an anchor within the layer for which to generate a scene;
    defining a three-dimensional, spherical outer boundary to capture at least one element within the scene within an interior of the spherical outer boundary;
    identifying a camera position within the scene, wherein the camera position is placed at the periphery of the spherical outer boundary, the camera is directed toward the interior of the spherical outer boundary, and the camera position is movable along the periphery of the spherical outer boundary; and
    rendering, using a scene rendering module implemented in at least one of hardware and software at the mobile device, the scene based on the camera position.

2. The method of claim 1, wherein the layer corresponds to a floor in a building.

3. The method of claim 1, wherein identifying an anchor includes:
    identifying a real-world location of a user;
    calculating a corresponding location within the layer; and
    identifying an anchor that is closest in distance to the corresponding location.

4. The method of claim 3, wherein identifying the real-world location of the user includes using information from at least one of a visual positioning system that uses visual information captured by at least one camera, and third-party signal triangulation based on at least one of WiFi, Bluetooth, and audio signals.

5. The method of claim 1, further comprising defining a texture of the three-dimensional, spherical outer boundary, wherein the texture forms a background for the scene.

6. The method of claim 5, wherein the background for the scene is provided by a computing device that captures at least one of a video feed and an image feed.

7. The method of claim 1, further comprising:
  identifying, at the mobile device, at least one of a specific element and location in the layer where content data may be attached; and
  uploading, from the mobile device, content data to the digital data repository via the wireless communication link for attachment to the identified element or location for consumption by other mobile devices.

8. The method of claim 7, wherein the content data includes a promotional offer for sale, point of interest information, or an icon for user interaction.

9. The method of claim 7, wherein the content data includes an image defining a spot in the layer to be used by a visual positioning system as reference data.

* * * * *